(12) United States Patent
Ray

(10) Patent No.: US 8,237,979 B2
(45) Date of Patent: Aug. 7, 2012

(54) SYSTEM AND METHOD OF UTILIZING TAB ATTRIBUTES AS JOB TICKET ATTRIBUTES FOR PRINTING

(75) Inventor: Elton Tarik Ray, Lakeville, NY (US)

(73) Assignee: Xerox Corporation, Norwalk, CT (US)

( * ) Notice: Subject to any disclaimer, the term of this patent is extended or adjusted under 35 U.S.C. 154(b) by 822 days.

(21) Appl. No.: 12/362,126

(22) Filed: Jan. 29, 2009

(65) Prior Publication Data

US 2010/0188706 A1 Jul. 29, 2010

(51) Int. Cl.
*G06K 15/00* (2006.01)
(52) U.S. Cl. ............... 358/1.18; 358/1.13; 358/1.15; 400/76; 400/578; 271/9.01
(58) Field of Classification Search ............ 358/1.18, 358/1.1, 1.13, 1.14, 1.15; 399/16; 400/279, 400/578, 76; 271/9.01
See application file for complete search history.

(56) References Cited

U.S. PATENT DOCUMENTS

| 5,452,062 | A | 9/1995 | Baldwin et al. | |
|---|---|---|---|---|
| 2001/0043365 | A1 | 11/2001 | Kremer | |
| 2002/0131075 | A1 | 9/2002 | Kremer | |
| 2004/0184103 | A1* | 9/2004 | Kremer et al. | 358/1.18 |
| 2006/0012817 | A1* | 1/2006 | Wu | 358/1.13 |
| 2006/0104687 | A1 | 5/2006 | Campbell et al. | |
| 2007/0009300 | A1 | 1/2007 | Young et al. | |
| 2007/0257423 | A1 | 11/2007 | Mandel | |
| 2008/0151285 | A1 | 6/2008 | Morales et al. | |
| 2008/0180728 | A1* | 7/2008 | Sekine | 358/1.15 |
| 2009/0279126 | A1* | 11/2009 | Williams | 358/1.15 |

OTHER PUBLICATIONS ("JDF Specification 1.4", Nov. 10, 2008, published by CIP4; excerpts provided, hereinafter referred to as the JDF 1.4 Spec; the entire document may be downloaded from the CIP4 website at <http://www.cip4.org/>.*

* cited by examiner

*Primary Examiner* — King Poon
*Assistant Examiner* — David S Cammack
(74) *Attorney, Agent, or Firm* — Gibb & Riley, LLC

(57) ABSTRACT

A system for utilizing tab attributes includes a communications component, a user interface component, a ticket generation component, and a job submissions component. The communications component operatively communicates at least one print document. The user interface component operatively communicates user data including tab data. The ticket generation component generates a ticket including at least one tab attribute. The ticket generation component communicates with the communications component and the user interface. The ticket generation component receives the user data from the user interface component and the ticket generation component receives the at least one print document from the communications component. The ticket is associated with the at least one print document. The ticket includes at least one tab attribute generated as a function of the received tab data. The job submission component submits a job to a printer and the job includes the ticket and the at least one print document. The system is at least partially implemented by an operative set of processor executable instructions configured for execution by at least one processor.

20 Claims, 4 Drawing Sheets

SYSTEM AND METHOD OF UTILIZING TAB ATTRIBUTES AS JOB TICKET ATTRIBUTES FOR PRINTING

BACKGROUND

1. Technical Field

The present disclosure relates to printing systems, and in particular, to a system and method of utilizing tab attributes as job ticket attributes for printing.

2. Description of Related Art

Page description language files (referred to herein as "PDL files") are computer languages and/or file formats that can be translated into printed documents. Many printing systems can accept a PDL file directly without pre-processing by another device such as a computer. PDL files are generally designed to describe how characters, graphics, and/or images should be printed on a substrate by a printing system. PDL files generally store printing data in a more abstract manner than pixel-wise image files. For example: rather than describing a square pixel-by-pixel, a PDL file may describe the square in terms of position, size, color and the like. PDL files sometimes have advantages over bitmap files, such as generally reduced file sizes and increased platform independence. Additionally, some printing systems receive PDL files directly with minimal or no pre-processing necessary before the file is received by the printing system.

When setting up one or more PDL files for printing, specialized printing tools can assist a user in controlling the settings, printing flow, and/or other parameters for setting up a printing job for a printing system. For example: it is common to apply exception level programming to a PDL file before printing commences. Generally, "exceptions" in this context are items not included in the original page content of the PDL file or contain different item level programming from the body of the job. These are considered to be "exceptions" to the job-level programming that defines the body of the job. Exceptions may be applied to one or more pages and generally do not modify the PDL file itself, but rather provide an effective way to make last minute changes and/or specialized settings. Tools that apply exception level programming are called exception page programming tools.

Typically, exceptions are applied to paper stocks (covers, stock exceptions, page inserts), page sequencing (chapter starts), image quality and image shifting. Other exceptions may include subset finishing, imposition and page level annotation. For example, a PDL file may include image quality information, such as contrast settings, color settings and other settings associated with certain aspects of the PDL file; an exception may be applied to a particular page or a subset of pages that override these PDL properties.

Exception level programming may apply to the current stock (sometimes referred to as the paper stock). The stock is the type of medium or material that is to be printed on during processing by a printing system. Many modern printing systems have multiple sources of stock, separated by color, quality, weight, medium, material, finishing and/or coating material. For example, a PDL file may have 30 pages of text and one photographic quality page, and an exception may be associated with that photographic quality page to operatively instruct the printing system to utilize a medium more suitable for printing a photographic level of detail and/or to achieve another desired quality associated with printing photographic quality pages.

In addition, some exception level programming may include "subset finishing" features, where a subset of pages, sheets, or other aspects are modified. For example, a subset of pages may have certain attributes that are modified in the printing process, such as the use of high quality paper for a certain chapter of a PDL file. Also, an exception (or subset finishing) may be applied for stapling a range of pages within a print job. These changes are also considered exception level programming. Tools that engage in exception level programming are referred to as exception level programming tools.

Tabbed sheets are sometimes used to section various types of print media. For example, tabbed sheets may be used to indicate the beginning of chapters. These tabbed sheets have a raised area in which markings may be made by a printing system (e.g. "chapter 1") to allow a reader to quickly turn to various sections of the printed media.

SUMMARY

The present disclosure relates to printing systems, and in particular, to a system and method of utilizing tab attributes as job ticket attributes for printing.

In an embodiment of the present disclosure, a system for utilizing a tab attribute as a job ticket attribute is at least partially implemented by an operative set of processor executable instructions configured for execution by at least one processor. The system includes a communications component, a user interface component, a ticket generation component and a job submission component. The communications component can communicate one or more print documents (e.g. page description language files such as PDF files) with another component. The user interface communicates user data including tab data. The ticket generation component is in operative communication with the communications component and receives the one or more print documents therefrom. The ticket generation component is further in operative communications with the user interface component and receives user data from the user interface.

The ticket generation component generates a ticket. The ticket is associated with the one or more print documents. The ticket can include one or more tab attributes. The ticket generation component generates the one or more tab attribute as a function of the received tab data. The job submission component is adapted to operatively submit a job to a printing system. The job includes the ticket and the one or more print documents. In an embodiment of the present disclosure, the system is an exception page programming tool configured to program a xerographic machine and/or an electrostatographic machine. Additionally or alternatively, the one or more of the tab attributes may be a page exception.

In another embodiment of the present disclosure, the one or more tab attributes may include (or be one of) one or more of: a tab text, a tab font, a tab position, a tab position within a document, and/or another tab position between the document and another document of the one or more documents. One or more of the tab attributes may include (or be one of) a tag-based attribute. The tag-based attribute may be a start tag, an end tag, and a tag content value. Additionally or alternatively, the one or more tab attributes may include one or more printing system-independent tab attributes.

In yet another embodiment of the present disclosure, a system for providing tab attributes as a job ticket attribute includes a job queue and a printer interface. The system is at least partially implemented by an operative set of processor executable instructions configured for execution by at least one processor. The system, the job queue and/or the printer interface component may be an installable module installable in a printing system. The job queue is adapted to queue one or more jobs. A job of the one or more jobs includes a ticket and one or more print documents (e.g., a page description language file such as a pdf file). The ticket is associated with the one or more print documents. The ticket can include one or more tab attributes. A tab attribute of the one or more tab attributes may be printing system independent defining a printing system-independent tab attribute. Additionally or alternatively, one or more of the tab attributes may be a page exception. For example, the tab attributes may include one or more of: a tab text, a tab font, a tab position, a tab position within a document and a tab position between documents.

The printer interface component operatively communicates with the job queue. The printer interface component can communicate the printer instructions to a printer. The printer interface component generates printer instructions as a function of the job. The printer instructions includes a first printer instruction to print the one or more print document and a second printer instruction to insert at least one tabbed sheet along with the at least one print document. The second printer instruction includes another printer instruction to insert a tabbed sheet before a print document, after a print document and/or between pages of a print document.

In yet another embodiment of the present disclosure, a method for utilizing a tab attribute as a job ticket attribute includes: communicating a job including a ticket and at least one print document. The ticket is associated with the at least one print document and includes at least one tab attribute. The method further includes: determining a position to place a tabbed sheet among the at least one print document based upon the at least one tab attribute; printing the at least one print document of the job; and/or placing the tabbed sheet among the at least one print document in the determined position. The method may also include: determining tab text based upon the at least one tab attribute and/or printing the tab text on a tab of the tabbed sheet.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
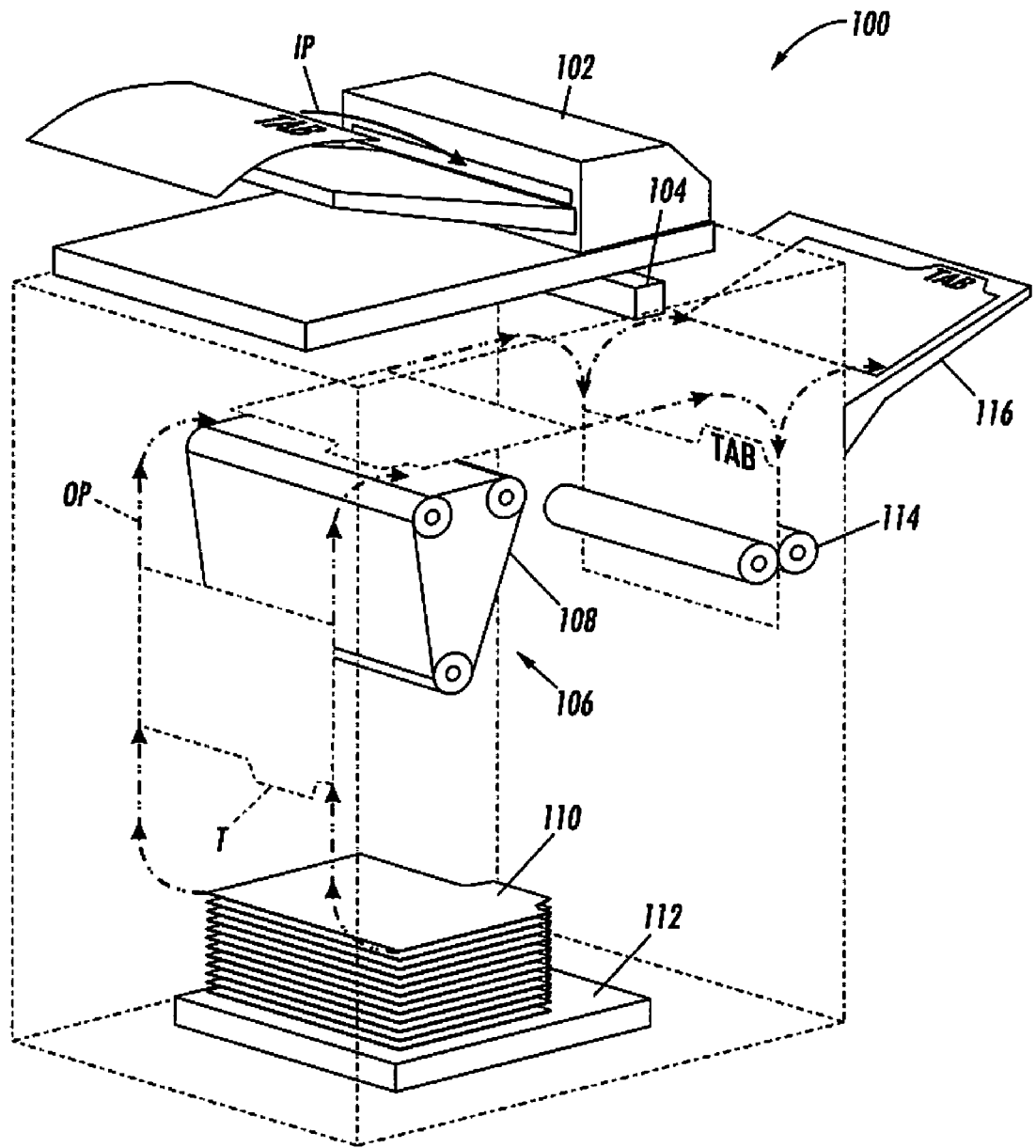
FIG. 1 is a perspective view showing some elements of a multifunction printing system in accordance with the present disclosure.

Referring to the drawings, FIG. 1 is a perspective view showing some elements of a digital copier 100. The digital copier accepts original images on input sheets fed through a document handler generally indicated as 102. Input sheets fed in succession through document handler 102 pass over an input scanner 104, which records light from a series of small areas on each input sheet, yielding digital image data, in a manner generally familiar in the art. Because the input sheets move in an input process direction IP relative to the input scanner 104, there can be said to be a "lead edge" associated with each input sheet, meaning the first edge "seen" by the input scanner 104. In this embodiment, a lead edge of an input sheet can be deemed a "first line" of a raster for reckoning image data recorded by the image scanner 104.

In a digital copier, there is also a print engine, here generally indicated as 106. In this embodiment, which is a xerographic printing system, the print engine 106 includes a rotatable image receptor, such as electrostatographic photoreceptor 108, on which images are created and subsequently transferred, in a manner generally familiar in the art (typical elements associated with xerography, such as development, exposure, transfer and cleaning stations, are not shown).

Output sheets, on which images are placed by the print engine 106, are initially placed in one of a set of paper supply stacks, from which they are drawn one at a time. One such paper supply stack is indicated as 110, although there are typically other stacks available for feeding into the print engine 106, each with a paper supply of a predetermined type. Paper supply stack 110 here includes "tab stock," meaning, in this embodiment, sheets which have general dimensions similar to regular stock (such as letter, tabloid, A3, A4, etc.) but in addition have a tab T defined along one edge thereof. The tab T effectively increases the dimension of the tab stock, relative to a corresponding dimension in the regular stock: to take one example, for use in a book made from 8½×11 inch sheets, a suitable piece of tab stock will have a width of about nine inches, of which 8½ inches corresponds to the regular width of the sheets, plus an extra half inch associated with the tab.

As shown in FIG. 1, the stack 110 of tab stock is placed in a drawer or tray 112 in such a way that, when a sheet of tab stock is drawn from stack 110 and passed through print engine 106 along an output process direction OP, the tab on the sheet is disposed at the trail edge of the sheet. After the sheet passes out of the print engine 106, the sheet can be inverted in an inverter 114, which causes the tab stock to be flipped over so that the tab is at a lead edge as the sheet moves to output tray 116 (or into a finishing device, such as a stapler, stacker or booklet maker, not shown). The inverter 114, in the illustrated embodiment, also causes the image placed on the tab stock by photoreceptor 108, which is face-down when transferred to the sheet, to be face-up.

Figure 2:
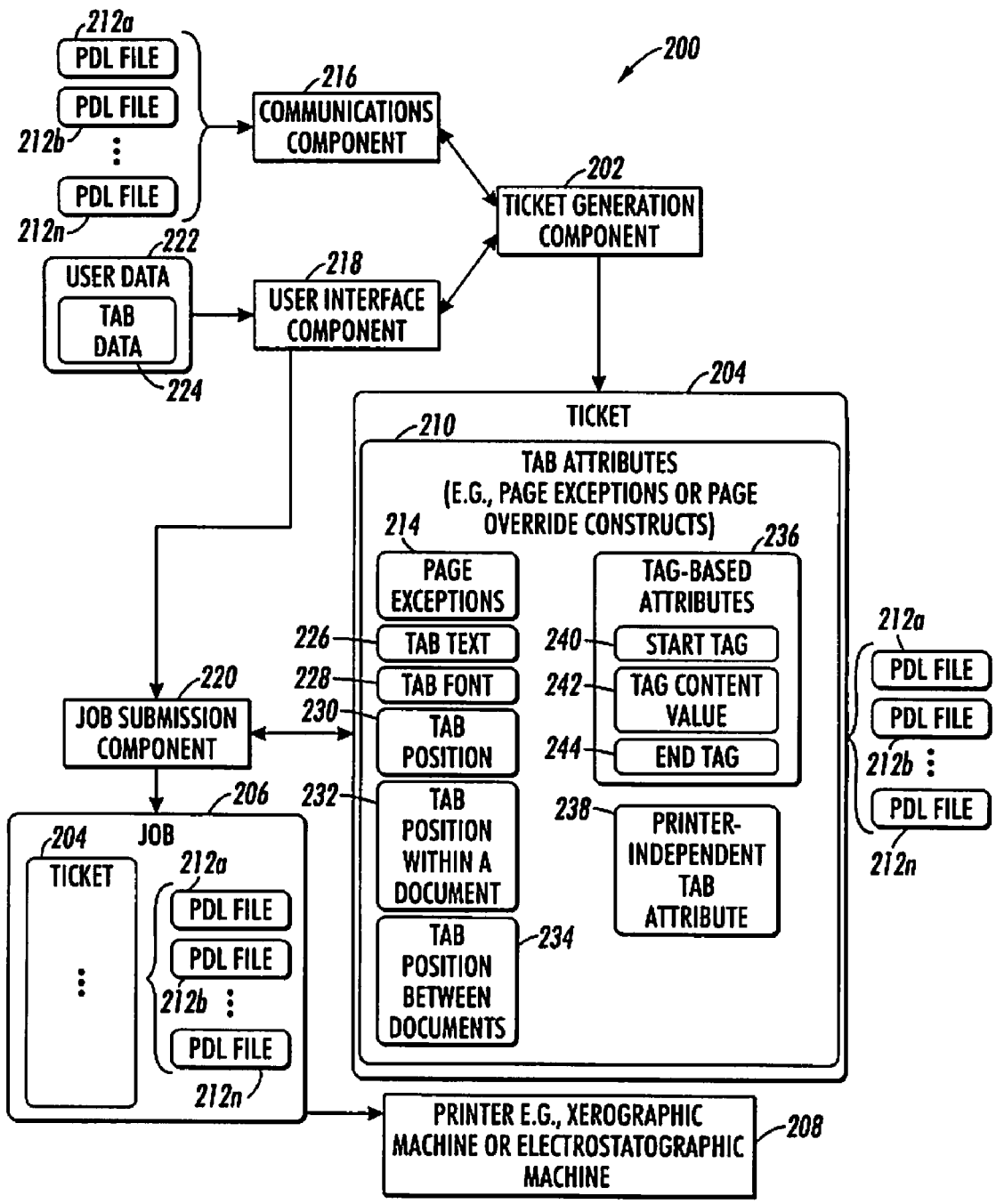
FIG. 2 is a block diagram of a system for generating a ticket having tab attributes in accordance with the present disclosure.

Referring to the drawings, FIG. 2 shows a block diagram of a system 200 having a ticket generation component 202 for generating a ticket 204. System 200 can generate a ticket 204 for inclusion within a job 206 for printing by a printer 208. Ticket 204 may also be referred to as a "job ticket", which may be described as the instructions that is submitted as part of job 206 (discussed below) for printing by printer 208. Ticket 204 includes tab attributes 210 which may include one or more attributes associated with tabbed sheets, tabs, printing tabs and the like (discussed in more detail below).

One type of prior art tab-printing required: (1) including an oversized page in the PDF or Postscript file (two types of PDL files) to be printed (2) such that the oversized page would have an oversized printing area, (3) and placing the tab text which corresponds to the printing region of the page such that the tab text aligns with the tab in the PDF or Postscript files when printed on a tabbed sheet. The tabbed sheets are sometimes part of a "special" paper stock and/or are separate from other paper stock. System 200 includes tab attributes 210 as part of ticket 204, rather than as part of one or more of PDL files 212 as described above relating to the prior art tab-printing, e.g., tab attributes 210 may be page exceptions 214 (discussed in more detail below).

System 200 includes the ticket generation component 202, a communications component 216, a user interface component 218 and a job submission component 220. The ticket generation component 202 generates the ticket 204 that includes the tab attributes 210. System 200 may be implemented in hardware, software, software in execution, firmware, in virtualization, bytecode and the like. System 200 may be an exception page programming tool configured to program a printer 208. Printer 208 may be a xerographic machine and/or an electrostatographic machine. Additionally or alternatively, system 200 may be part of (or may include) a print driver of a personal computer.

PDL files 212a through 212n are shown in FIG. 2 (the n designation indicates an arbitrary number of PDL files). PDL files 212 are communicated via communications component 216 to ticket generation component 202. Ticket generation component is in operative communications with communications component 216 and can receive the PDL files 212 therefrom. Communications component 216 may be implemented in memory such that communications component 216 temporarily stores all or part of one of PDL files 212 therein. For example, communications component 216 may retrieve PDL files 212 from a hard disk and temporarily store them in memory, such as a cache, a heap, a stack and the like. Additionally or alternatively, communications component 216 may simply point to the PDL files; for example, a RAM-based pointer may point to a memory address on a hard drive of a personal computer.

As previously mentioned, communications component 216 communicates the PDL files 212 to ticket generation component 202. The communications between communications component 216 and ticket generation component 202 may be over a network, intra- or inter-process communications, intra- or inter thread communications, application programming interfaces and/or the like. Additionally or alternatively, any of components 202, 216, 218 and/or 220 may communicate using a network, intra- or inter-process communications, intra- or inter thread communications, application programming interfaces and/or the like.

System 200 also includes user interface component 218. User interface component 218 communicates user data 222 including tab data 224. User interface component 218 is in operative communications with ticket generation component 202 and can communicate the user data 222 thereto. User interface component 218 may be a pop-up dialog box within a graphical user interface (referred to herein as "GUI") based interface. User data 222 may include data relating to an event within the pop-up dialog. For example, a mouse click and/or a text box entry may be included within user data 222. User data 222 may also include a desire to print one or more of PDL files 212, e.g., user interface component 218 may be part of a print driver and/or a pop-up dialog box that appears after a user selects "print" from a menu bar. Tab data 224 may include data relating to tabbed sheets, tabs, printing tabs and the like. Tab data 224 may include data relating to: (1) desired insertions of one or more tabbed sheets within one of PDL files 212 when printed, (2) desired placement of one or more of tabbed sheets between two of PDL files 212 when printed, (3) what type of tabbed sheets are desired, (4) what tab text is desired, (5) and the like.

As mentioned above, ticket generation component 202 generates ticket 204 including tab attributes 210. The ticket 204 may also be referred to as a job ticket. Ticket 204 is associated with PDL files 212. Tab attributes 210 include page exceptions 214, a tab text 226, a tab font 228, a tab position 230, a tab position within a document 232, a tab position between documents 234, tag-based attributes 236 and a printing system-independent tab attribute 238. Each of the tab attributes 210 may be interrelated and/or may include each other. For example, tag-based attributes 236 may be implemented within page exceptions 214 or vice versa.

Tab Text 226 may be the text a user desires to print onto a tabbed sheet. Tab font 228 is the font desired to be printed when printing tab text 226. Tab position 230 may be a desired position to place a tabbed sheet within one of PDL files 212, between two of PDL files 212 or may be dimensional aspects of the tabbed sheet, e.g., where the raised tab should be located and the like. Tab position within a document 232 indicates which position to insert a tabbed sheet within one of PDL files 212. Tab position between documents 234 indicates a position to insert a tabbed sheet between two of PDL files 212.

Tag-based attributes 236 includes attributes that are based on tags, and include start tag 240, tag content value 242, and end tag 244. For example, a tag-based attributes 236 such as "<INSERT_AFTER_PDL_PAGE>4</INSERT_AFTER_PDL_PAGE><TEXT>Chapter 2</TEXT><FONT>SansSerif</FONT>". The string of "<INSERT$_{AFTER}$_PDL_PAGE>4</INSERT_AFTER_PDL_PAGE>" indicates to insert a tabbed sheet after page 4 of one of PDL files 212. The string of "<TEXT>Chapter 2<TEXT>" indicates that the text "Chapter 2" should be printed in the tab area. The string of "<FONT>SansSerif</FONT>" indicates that the font of SansSerif is to be used to print in the tab area.

Also consider that the tag-based attributes 236 may be start tag 240, tag content value 242, and end tag 244. Consider the string "<TEXT>Chapter 2</TEXT>". The start tag 240 may indicate the beginning of tab data, e.g., "<TEXT>". The tag content value 242 indicates the tab value, e.g., "Chapter 2". The end tag 244 indicates the end of the tag data content, e.g., "</TEXT>".

Figure 3:
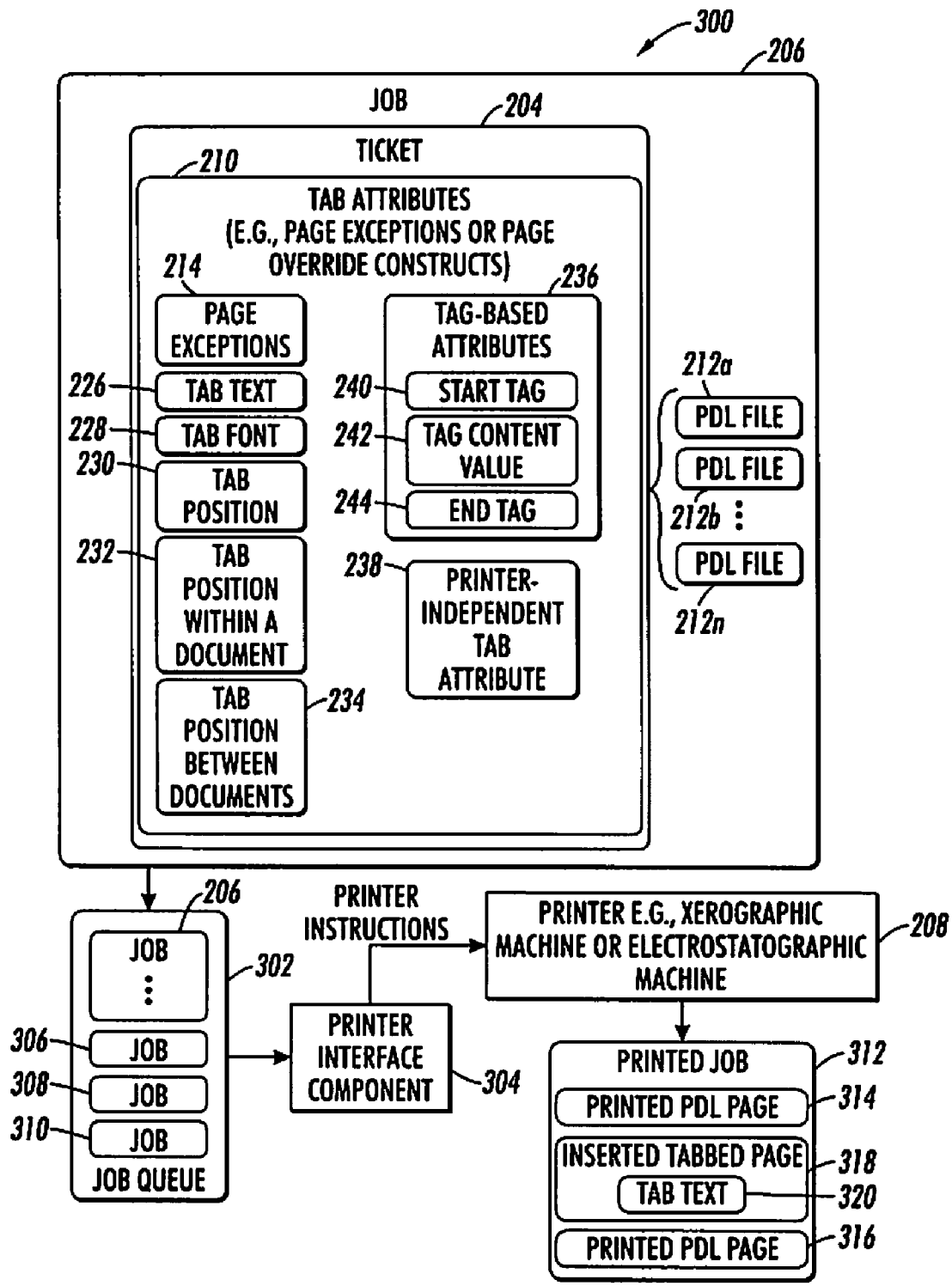
FIG. 3 is a block diagram of a system for processing a job including a ticket having tab attributes in accordance with the present disclosure.

FIG. 3 is a block diagram of a system 300 for processing a job (e.g., job 206) including a ticket (e.g., ticket 204) having tab attributes (e.g., tab attributes 210) in accordance with the present disclosure. System 300 includes a job queue 302 and a printer interface component 304. System 300 can receive job 206, which may have been generated by system 200 of FIG. 2. System 300 queues job 206 in job queue 302. Job Queue 302 may also include jobs 306 through 310. The job queue 302 interfaces with printer interface component 304, which can send printer instruction to printer 208. Printer interface component 304 generates printer instructions as a function of a job and can instruct printer 208 to print PDL files 212 with tab attributes 210 within ticket 204.

Printer 208 can process job 206 to print printed job 312. Printed job 312 includes printed PDL pages 314 and 316. Also, within printed job 312 there may be inserted tabbed sheet 318 having tab text 320. Inserted tabbed sheet 318 corresponds to tab attributes 210 of job 206. Note that the tab attributes are part of ticket 204 rather than one of PDL files 212. Inserted tabbed sheet 318 may be a tabbed sheet inserted between two of PDL files 212, within one of PDL files 212 and/or at the beginning or end of PDL files 212.

Figure 4:
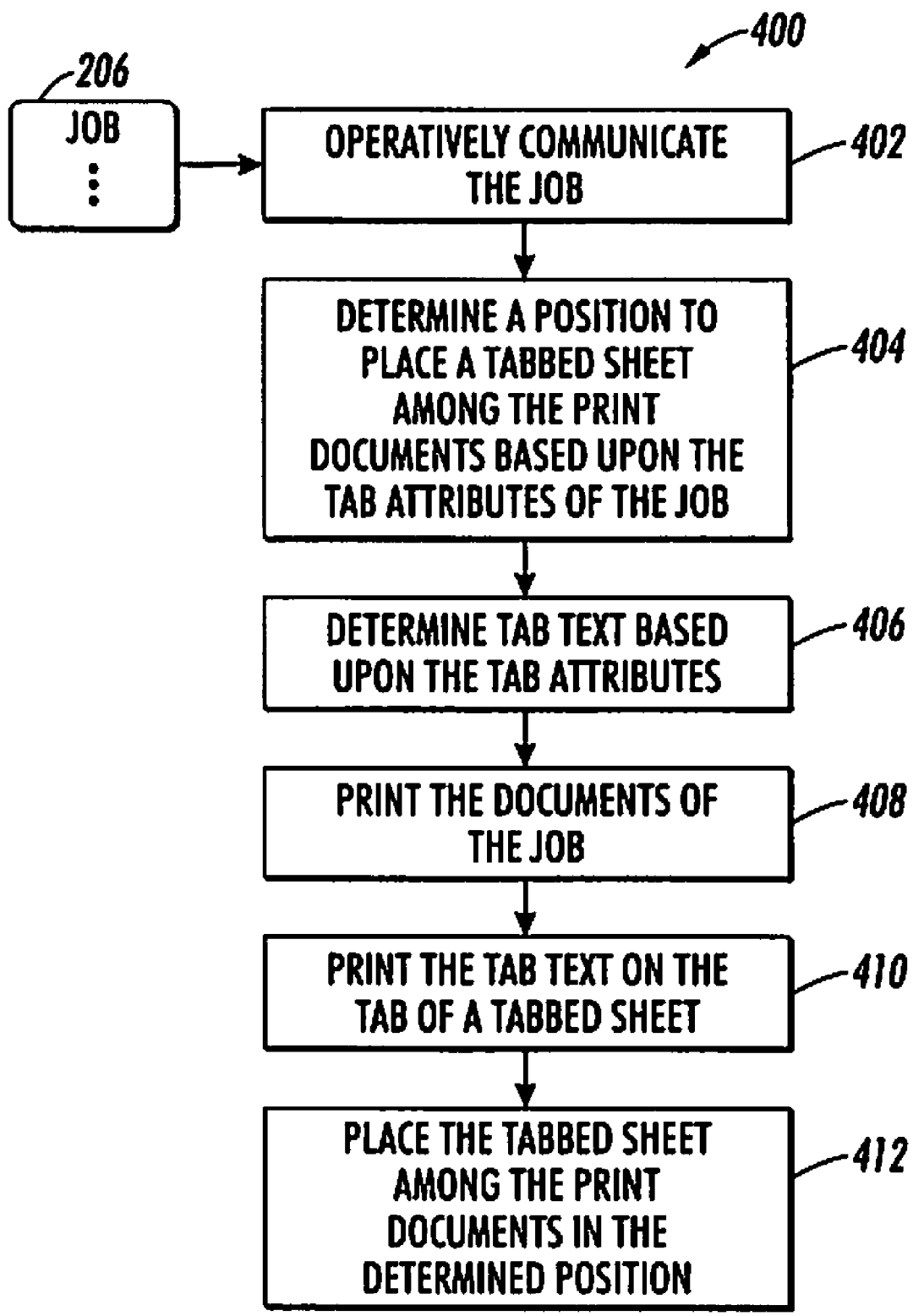
FIG. 4 is a flow chart diagram illustrating a method for utilizing a ticket of a job having tab attributes in accordance with the present disclosure.

Referring to the drawings, FIG. 4 is a flow chart diagram illustrating a method 400 for utilizing a ticket of a job having tab attributes in accordance with the present disclosure. Method 400 includes steps 402 through 412. Although method 400 is shown as implying a serial sequencing, any sequence may be used. For examples, steps 404 and 410 may occur simultaneously (e.g., in parallel); additionally or alternatively, any two (or more) of steps 404-410 may occur in a step-wise manner, for example, step 404 is performed to 50% completion, thereafter step 410 is performed to 40% completion, then step 404 is completed to 100% completion and the like. Method 400 may be implemented utilizing hardware, software, software in execution, firmware, in virtualization, bytecode and the like. Additionally or alternatively, method 400 may be performed by a printing system, a software tool, by system 200 of FIG. 2, or by system 300 of FIG. 3 (or utilizing the same) and the like.

Step 402 operatively communicates job 206. Job 206 is shown in abbreviated form to avoid obscuring FIG. 4 in unnecessary detail; for a full view of job 206, refer to job 206 as shown in FIG. 3. The job may be communicated between job submission component 220 and printer 208 (see FIG. 2), between job queue 302 and printer 208 via printer interface component 304 (see FIG. 2), and the like. Step 404 determines a position to place a tabbed sheet among the print documents based upon the tab attributes of the job 206. The position of step 404 may be (1) between PDL documents, (2) before a PDL document, (3) after a PDL document and/or (4) within a PDL document. Step 406 determines tab text based upon the tab attributes. Step 408 prints the document of the job 206. Step 410 prints the tab text on the tab of a tabbed sheet. Step 412 places the tabbed sheet among the print documents in the determined position. Steps 408 through 412 may be performed by printer 208 of FIGS. 2 and/or 3. The word "printer" as used herein encompasses any apparatus, such as a digital copier, bookmaking machine, facsimile machine, multi-function machine, an imaging forming apparatus, a copy machine, etc. which performs a print outputting function for any purpose. For example, a CMYK digital printer, a highlight color printer, a monochromatic printer, a fax machine, and the like are all printers as used herein.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for utilizing tab attributes while executing a print job, comprising:
    a communications component that communicates at least one print document;
    a user interface component that communicates user data including tab data;
    a ticket generation component that generates a ticket including at least one tab attribute that is not included in said at least one print document, said at least one tab attribute comprising position information for placing a tabbed sheet within said at least one print document, said ticket generation component being in operative communications with said communications component and said user interface, said ticket generation component being configured to operatively receive said user data from said user interface component and said ticket generation component being further configured to operatively receive said at least one print document from said communications component, said ticket being associated with said at least one print document, said ticket including at least one tab attribute generated as a function of said received tab data; and
    a job submission component that submits a job to a printer, said job including a first file comprising said ticket and a second file comprising said at least one print document,
    said communications component, said user interface component, said ticket generation component, and said job submission component being at least partially implemented by an operative set of processor executable instructions configured for execution by at least one processor.

2. The system according to claim 1, said system comprising an exception page programming tool configured to program at least one of a xerographic machine and an electrostatographic machine.

3. The system according to claim 1, said at least one print document comprising a page description language file.

4. The system according to claim 1, said at least one tab attribute comprising a page exception.

5. The system according to claim 1, said at least one tab attribute comprising at least one of a tab text, a tab font, a tab position, a tab position within a document of said at least one document, and another tab position between said document of said at least one document and another document of said at least one document.

6. The system according to claim 1, said at least one tab attribute comprising a tag-based attribute.

7. The system according to claim 6, said tag-based attribute comprising one of a start tag, an end tag and a tag content value.

8. The system according to claim 1, said at least one tab attribute comprising a printing system-independent tab attribute.

9. A system for utilizing tab attributes while executing a print job, comprising:
    at least one processor;
    a job queue that queues at least one print job, said at least one print job including a first file comprising a ticket and a second file comprising at least one print document, said ticket being associated with said at least one print document, said ticket including at least one tab attribute that is not included in said at least one print document; and
    a printer interface component that communicates with said job queue, said printer interface component generating printer instructions as a function of said print job, said printer instructions including a first printer instruction to print said at least one print document and a second printer instruction to insert at least one tabbed sheet along with said at least one print document, the position of said at least one tabbed sheet within said at least one print document being based on said at least one tab attribute,
    said job queue and said printer interface component being at least partially implemented by an operative set of processor executable instructions configured for execution by said at least one processor.

10. The system according to claim 9, said second printer instruction including another printer instruction to insert a tabbed sheet in one of before and after a print document of said at least one print document.

11. The system according to claim 9, said second printer instruction including another printer instruction to insert a tabbed sheet between a page and another page of a print document of said at least one print document.

12. The system according to claim 9, one of said system, said job queue and said printer interface component comprising an installable module installable in a printing system.

13. The system according to claim 9, further comprising a printer, said printer interface component communicating said printer instructions to said printer.

14. The system according to claim 9, a tab attribute of said at least one tab attribute being printing system independent.

15. The system according to claim 9, said at least one print document including a page description language file.

16. The system according to claim 9, said at least one tab attribute including a page exception.

17. The system according to claim 9, said at least one tab attribute including at least one of a tab text, a tab font, a tab position, a tab position within a document of said at least one document, and another tab position between said document of said at least one document and another document of said at least one document.

18. A method for utilizing tab attributes while executing a print job, comprising:

operatively communicating a print job to a printer, said print job including a first file comprising a ticket and a second file comprising at least one print document, said ticket being associated with said at least one print document and said ticket including at least one tab attribute that is not included in said at least one print document;

determining a position to place a tabbed sheet among said at least one print document based upon said at least one tab attribute of said print job;

printing said at least one print document of said print job; and placing said tabbed sheet among said at least one print document in said determined position, during execution of said print job.

19. The method according to claim 18, further comprising: determining tab text based upon the at least one tab attribute.

20. The method according to claim 19, further comprising: printing said tab text on a tab of said tabbed sheet.

* * * * *